US011387865B2

(12) United States Patent
You et al.

(10) Patent No.: US 11,387,865 B2
(45) Date of Patent: Jul. 12, 2022

(54) POWER LINE COMMUNICATION METHOD AND APPARATUS

(71) Applicant: Huawei Technologies Co., Ltd., Shenzhen (CN)

(72) Inventors: Yong You, Dongguan (CN); Hua Li, Dongguan (CN); Dao Pan, Dongguan (CN); Peng Xiao, Shenzhen (CN); Lingxiao Kong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 17/021,639

(22) Filed: Sep. 15, 2020

(65) Prior Publication Data
US 2020/0412410 A1 Dec. 31, 2020

Related U.S. Application Data

(63) Continuation of application No. PCT/CN2018/121863, filed on Dec. 18, 2018.

(30) Foreign Application Priority Data
Mar. 16, 2018 (CN) .......................... 201810218816.X

(51) Int. Cl.
H04B 3/462 (2015.01)
H04B 3/23 (2006.01)
(Continued)

(52) U.S. Cl.
CPC ............ H04B 3/462 (2013.01); H04B 3/23 (2013.01); H04B 3/48 (2013.01); H04L 1/0004 (2013.01); H04L 1/0009 (2013.01)

(58) Field of Classification Search
CPC .. H04B 3/542; H04B 2203/5495; H04B 3/54; H04B 3/462; H04B 3/23; H04B 3/48;
(Continued)

(56) References Cited

U.S. PATENT DOCUMENTS 8,891,605 B2 * 11/2014 Afkhami ................. H04B 3/54
375/227
2005/0190785 A1 * 9/2005 Yonge, III ............ H04L 5/0044
370/465

FOREIGN PATENT DOCUMENTS

CN 1722629 A 1/2006
CN 1937435 A 3/2007
(Continued)

OTHER PUBLICATIONS

Kim, K-H. et al., "Channel Adaptation for Time-varying Powerline, Channel and Noise Synchronized with AC Cycle," 2009 IEEE International Symposium on Power Line Communications and its Applications, pp. 250-254.
(Continued)

Primary Examiner — David S Huang
(74) Attorney, Agent, or Firm — Slater Matsil, LLP

(57) ABSTRACT

This application provides a power line communication method. Wherein, a first node determines a channel status of a channel between a second node and the first node in an alternating current cycle. Then, the first node may divide the alternating current cycle into time windows based on the channel status, and determine modulation coding parameters used for data transmission between the second node and the first node in the time window obtained through division. Further, the first node may send information about the time window obtained through division and the modulation coding parameters used in the time window obtained through division to the second node.

11 Claims, 14 Drawing Sheets

(51) Int. Cl.
*H04B 3/48* (2015.01)
*H04L 1/00* (2006.01)

(58) Field of Classification Search
CPC ............... H04L 25/0204; H04L 25/022; H04L 25/0228; H04L 5/0046; H04L 1/0004; H04L 1/0009
See application file for complete search history.

(56) References Cited

FOREIGN PATENT DOCUMENTS

| | | |
|---|---|---|
| CN | 101176270 A | 5/2008 |
| CN | 102833147 A | 12/2012 |
| CN | 103856243 A | 6/2014 |
| CN | 104218975 A | 12/2014 |
| CN | 106557282 A | 4/2017 |
| CN | 107682047 A | 2/2018 |
| EP | 3065303 A1 | 9/2016 |
| WO | 2014037066 A1 | 3/2014 |

OTHER PUBLICATIONS

ITU-T, G.9960, Corrigendum 3 (Nov. 2016), Series G: Transmission Systems and Media, Digital Systems and Networks, Access networks—In premises networks; Unified high-speed wire-line based home networking transceivers-System architecture and physical layer specification, Corrigendum 3, Nov. 2016, 162 pages.

Colen, G.R. et al., "A Bit Loading Technique with Reduced Complexity for Periodically Time Varying PLC Channel", 2015 IEEE International Symposium on Power Line Communications and Its Applications (ISPLC), Mar. 29-Apr. 4, 2015, 5 pages.

* cited by examiner

|    | 1  | 2  | 3  | 4  | 5  | 6  | 7  | 8  |
|----|----|----|----|----|----|----|----|----|
| W0 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |
|    | 1  | 2  | 3  | 4  | 5  | 6  | 7  | 8  |
| W1 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |
|    | 1  | 2  | 3  | 4  | 5  | 6  | 7  | 8  |
| W2 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |
|    | 1  | 2  | 3  | 4  | 5  | 6  | 7  | 8  |
| W3 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |
|    | 1  | 2  | 3  | 4  | 5  | 6  | 7  | 8  |
| W4 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |
|    | 1  | 2  | 3  | 4  | 5  | 6  | 7  | 8  |
| W9 | 9  | 10 | 11 | 12 | 13 | 14 | 15 | 16 |
|    | 17 | 18 | 19 | 20 | 21 | 22 | 23 | 24 |
|    | 25 | 26 | 27 | 28 | 29 | 30 | 31 | 32 |

| PRE | PRE | PRE | PRE | PRE | PRE | PRE | PRE |
|---|---|---|---|---|---|---|---|
| 0 | 0 | 0 | 0 | 0 | 0 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 2 | 2 | 2 | 2 | 2 | 2 | 3 | 3 |
| 3 | 3 | 3 | 3 | 3 | 3 | 3 | 3 |
| 3 | 3 | 3 | 3 | 3 | 3 | 3 | 3 |
| 3 | 3 | 3 | 3 | 3 | 3 | 3 | 3 |
| 4 | 4 | 4 | 4 | 4 | 4 | 5 | 5 |
| 5 | 5 | 5 | 5 | 5 | 5 | 5 | 5 |
| 5 | 5 | 5 | 5 | 5 | 5 | 5 | 5 |
| 5 | 5 | 5 | 5 | 5 | 5 | 5 | 5 |
| 6 | 6 | 6 | 6 | 6 | 6 | 7 | 7 |
| 7 | 7 | 7 | 7 | 7 | 7 | 7 | 7 |
| 7 | 7 | 7 | 7 | 7 | 7 | 7 | 7 |
| 7 | 7 | 7 | 7 | 7 | 7 | 7 | 7 |
| 7 | 7 | 7 | 7 | 7 | 7 | 7 | 7 |
| 7 | 7 | 7 | 7 | 7 | 7 | 7 | 7 |
| 7 | 7 | 7 | 7 | 7 | 7 | 7 | 7 |
| ... | | | | | | | |
| 15 | 15 | 15 | 15 | 15 | 15 | 15 | 15 |
| 16 | 16 | 16 | 16 | 16 | 16 | 17 | 17 |
| 17 | 17 | 17 | 17 | 17 | 17 | 17 | 17 |

FIG. 8a

| | | | | | | | |
|---|---|---|---|---|---|---|---|
| 0 | 0 | 0 | 0 | 0 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| ... | | | | | | | |
| 0 | 0 | 0 | 0 | 0 | 0 | 0 | 0 |
| 1 | 1 | 1 | 1 | 1 | 1 | 0 | 0 |
| 0 | 0 | 0 | 0 | 0 | 0 | 0 | 0 |

FIG. 9a

POWER LINE COMMUNICATION METHOD AND APPARATUS

CROSS-REFERENCE TO RELATED APPLICATIONS

This application is a continuation of International Application No. PCT/CN2018/121863, filed on Dec. 18, 2018, which claims priority to Chinese Patent Application No. 201810218816.X, filed on Mar. 16, 2018. The disclosures of the aforementioned applications are hereby incorporated by reference in their entireties.

TECHNICAL FIELD

This application relates to the field of communications technologies, and in particular, to a power line communication method and an apparatus.

BACKGROUND

Power line communication (PLC) refers to transmission of data or information through existing power lines according to a digital signal processing method. The power line communication has a major advantage that new network lines do not need to be deployed because the power lines have already been widely deployed. However, the power line is not a network line specially designed for communication. A time-varying load and time-varying noise on the power line leads to a time-varying capability of the power line of actually bearing data transmission, namely, a time-varying channel capacity, when the power line is used as a channel for data transmission. The channel capacity refers to a maximum data transmission rate on the channel. Therefore, if a communications node on the power line always transmits data by using one set of modulation coding parameters, a rate at which the communications node transmits data may not reach an actual channel capacity.

Currently, it is found through research that variations of a load and noise on the power line in alternating current cycles on the power line are basically consistent. Correspondingly, variations of actual channel capacities on the power line in the alternating current cycles are also basically consistent. Based on the foregoing variation characteristics of the channel capacity, it is proposed in an existing solution that: each alternating current cycle may be equally divided into a plurality of time windows, and modulation coding parameters corresponding to each time window may be determined. In this way, the communications node may transmit data in each time window by using the corresponding modulation coding parameters. However, diversity of power line networks and electrical device loads result in diversified variations of a load and noise on a power line in each alternating current cycle, and corresponding diversified variations of an actual channel capacity of the power line in each alternating current cycle. In other words, the actual channel capacity in each alternating current cycle does not necessarily vary at a same time interval. Therefore, even if time windows are obtained through equal division, it is difficult to adapt to a variation of the actual channel capacity. In addition, a rate at which the communications node transmits data through the power line cannot reach the actual channel capacity.

SUMMARY

This application provides a power line communication method and an apparatus, to increase a rate at which data is to be transmitted through a power line.

According to a first aspect, this application provides a power line communication method. In the method, a first node determines a channel status of a channel between a second node and the first node in an alternating current cycle, where the channel status is used to reflect a status of a channel capacity. Then, the first node may divide the alternating current cycle into time windows based on the channel status, and determine modulation coding parameters used for data transmission between the second node and the first node in the time window obtained through division. Further, the first node may send information about the time window obtained through division and the modulation coding parameters used in the time window obtained through division to the second node. The modulation coding parameters are parameters selected by a physical layer for modulation and coding during data transmission, and include, for example, a bit loading quantity and a forward error correction code parameter. The information about the time window obtained through division includes a start timestamp and an end timestamp of the time window obtained through division; or the information about the time window obtained through division includes a start timestamp of the time window obtained through division and duration corresponding to the time window obtained through division.

In the foregoing method, a variation of the channel status of the channel between the two nodes in the alternating current cycle is determined, and then the alternating current cycle is divided into time windows based on the variation of the channel status. Compared with an existing solution in which time windows are obtained through fixed equal division, the implementation in the foregoing method can better reflect a variation of an actual channel capacity, so that the modulation coding parameters that are used for data transmission between the two nodes and that are determined in the time window obtained through division is more accurate, and a transmission rate at which data is to be transmitted can be improved and maximally approach the actual channel capacity.

In a possible design, after dividing the alternating current cycle into time windows, the first node may send the information about the time window obtained through division to the second node. Further, after determining the modulation coding parameters used for data transmission between the second node and the first node in the time window obtained through division, the first node sends the modulation coding parameters used in the time window obtained through division to the second node.

In addition, after sending the information about the time window obtained through division to the second node, the first node may receive a response message, sent by the second node, used to indicate that the information about the time window obtained through division is successfully received, and then proceed to determine the modulation coding parameters corresponding to the time window obtained through division. In this design, after determining that the information about the time window obtained through division has been successfully indicated to the second node, the first node performs a subsequent operation.

In another possible design, after dividing the alternating current cycle into time windows and determining the modulation coding parameters used in the time window obtained through division, the first node may send the information about the time window obtained through division and the modulation coding parameters used in the time window obtained through division to the second node. This design can simplify a signaling exchange procedure, and reduce signaling overheads.

In a possible design, when the first node divides the alternating current cycle into time windows based on the channel status, the first node may determine whether a timestamp at which the channel status is a transition state exists in the alternating current cycle, where that the channel status is the transition state is used to indicate that the channel capacity varies. If the timestamp exists, the first node may divide the alternating current cycle into time windows by using the timestamp at which the channel status is the transition state as a dividing point; or if the timestamp does not exist, the first node may use the alternating current cycle as the time window.

In the foregoing design, through detecting whether the timestamp at which the channel status is the transition state exists in the alternating current cycle, division into time windows is performed based on a location at which the channel status is the transition state, so that the time window obtained through division is more suitable for an actual channel variation.

In a possible design, the channel status used to reflect the status of the channel capacity includes at least one of a channel response or a channel noise level, and the channel response is a channel amplitude response and/or a channel phase response.

Specifically, if the channel status includes the channel response, when determining whether the timestamp at which the channel status is the transition state exists in the alternating current cycle, the first node may perform the following operations:

If the first node determines that a quantity of carriers that meet a preset condition in two adjacent time periods in the alternating current cycle is greater than a first preset value, the first node determines a critical point of the two adjacent time periods as the timestamp at which the channel status is the transition state, where the preset condition is that a difference between amplitudes of channel responses corresponding to the carrier in the two adjacent time periods is greater than a second preset value; or if the first node determines that a difference between average values of amplitudes of channel responses corresponding to N carriers in two adjacent time periods is greater than a third preset value, the first node determines a critical point of the two adjacent time periods as the timestamp at which the channel status is the transition state, where n is a positive integer.

Specifically, if the channel status includes the channel noise level, when determining whether the timestamp at which the channel status is the transition state exists in the alternating current cycle, the first node may perform the following operations: if the first node determines that a difference between channel noise levels in two adjacent time periods in the alternating current cycle is greater than a fourth preset value, the first node determines a critical point of the two adjacent time periods as the timestamp at which the channel status is the transition state.

In the foregoing design, a variation of the channel response or the channel noise level in the alternating current cycle is analyzed, and a variation of the channel capacity can be indirectly reflected. Therefore, a location at which the channel capacity suddenly varies can be accurately determined by detecting a location at which the channel response or the channel noise level greatly fluctuates.

In a possible design, when dividing the alternating current cycle into time windows, the first node may use a time period between every two adjacent timestamps at which the channel status is the transition state in the alternating current cycle as a time window, where that the channel status is the transition state is used to indicate that the channel capacity varies. In the time window obtained through such division, the channel capacity is basically in a stable state. Therefore, the modulation coding parameters subsequently determined for the time window obtained through division are more accurate, and a data transmission rate can be effectively improved.

Alternatively, the first node may use, in a time period between every two adjacent timestamps at which the channel status is the transition state, a time period in which the channel status is a same stable state as a time window, where that the channel status is the same stable state is used to indicate that the channel capacity is stable at a same value. In the time window obtained through such division, the channel status is basically the same stable state. According to the window division manner, the determined modulation coding parameters can be more accurate, and a data transmission rate can be effectively improved. In addition, according to the window division manner, on the premise of ensuring transmission performance, a minimal quantity of time windows are obtained through division, so that a relatively small quantity of modulation coding parameters need to be maintained, and system implementation is effectively facilitated.

According to a second aspect, this application provides a communications apparatus. The communications apparatus may be the first node in the first aspect, or may be a chip in the first node. The first node or the chip has a function of implementing the power line communication method in any one of the first aspect or the possible designs of the first aspect. The function may be implemented by using hardware, or implemented by hardware executing corresponding software. The hardware or the software includes one or more units corresponding to the foregoing function.

In a possible design, the communications apparatus includes a processing unit and a transceiver unit. Functions performed by the processing unit and the transceiver unit may correspond to the steps in the power line communication method performed by the first node in the first aspect. Details are not described herein again.

In another possible design, the communications apparatus includes a processor and a memory. The memory is configured to be coupled to the processor, and store a computer instruction and/or data necessary for implementing the power line communication method in any one of the first aspect or the possible designs of the first aspect. The processor may execute the computer instruction stored in the memory, to implement the power line communication method performed in any one of the first aspect or the possible designs of the first aspect. Optionally, the communications apparatus may further include a communications interface, and the communications interface may send and receive a message under control of the processor. Optionally, the memory may be integrated with the processor, or may be disposed separately from the processor.

According to a third aspect, this application provides a computer storage medium, where the computer storage medium stores a computer-readable instruction. When a computer reads and executes the computer-readable instruction, the computer can implement the power line communication method performed in any one of the first aspect or the possible designs of the first aspect.

According to a fourth aspect, this application provides a computer program product, where the computer program product includes a computer program, and the computer program is used to perform the power line communication method in any one of the first aspect or the possible designs of the first aspect.

BRIEF DESCRIPTION OF THE DRAWINGS

FIG. 8a is a schematic diagram 1 of time windows obtained through division according to an embodiment of this application;

FIG. 9a is a schematic diagram 2 of time windows obtained through division according to an embodiment of this application;

DETAILED DESCRIPTION OF ILLUSTRATIVE EMBODIMENTS

The following describes technical solutions of embodiments in this application with reference to the accompanying drawings.

First, some terms in the embodiments of this application are described for ease of understanding.

Figure 1:
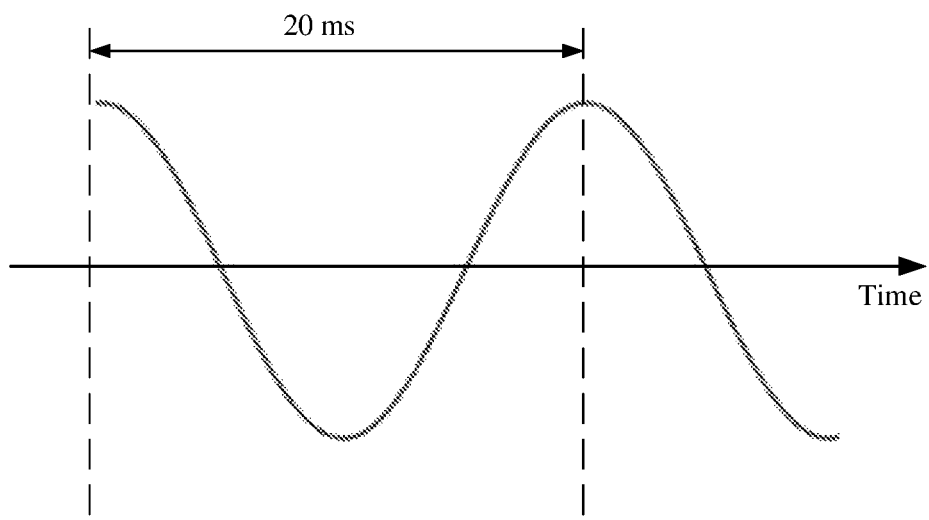
FIG. 1 is a schematic diagram of an alternating current cycle in the prior art.

(1) Alternating current cycle: An alternating current cycle is a cycle of an alternating current voltage on the power line. According to different standards from different countries, an alternating current voltage frequency may be 50 Hz or 60 Hz, corresponding to an alternating current cycle of 20 ms and an alternating current cycle of 16.67 ms respectively. FIG. 1 is a schematic diagram of an example of the alternating current cycle of 20 ms corresponding to the alternating current voltage frequency of 50 Hz.

(2) Time window: Time windows in this application may be defined as windows in power line communication that are obtained by dividing the alternating current cycle and in which data is transmitted by using different modulation coding parameters. For example, the time window may be a bit allocation table region (BAT region) defined in the ITU-T G.hn standard. The BAT region may be understood as time periods obtained after a medium access control (MAC) cycle (including two alternating current cycles) is divided. The alternating current cycle of 20 ms shown in FIG. 1 is used as an example. If the alternating current cycle is equally divided into 10 time windows in an existing manner, the time windows obtained through division may be a W0 to a W9 shown in a schematic diagram in FIG. 2. A P1 point represents a start time point, namely, a start timestamp, of the time window W0. A P2 point represents an end time point, namely, an end timestamp, of the time window W0. Duration between the P1 point and the P2 point is duration corresponding to the time window. As described above, because a power line channel varies by using the alternating current cycle as a cycle, common division into time windows is periodically repeated in the two alternating current cycles in the foregoing MAC cycle.

(3) Modulation coding parameter: Modulation coding parameters are parameters selected by a physical layer for modulation and coding during data transmission, and may include a bit loading quantity and forward error correction code parameters in an orthogonal frequency division multiplexing (OFDM) modulation scheme. The bit loading quantity may be understood as a quantity of bits loaded on every n carriers in the OFDM modulation scheme, and a modulation scheme for the carrier may be determined based on the bit loading quantity, where n is a positive integer. For example, if 10 bits may be loaded on a carrier whose carrier index is 4, it may be determined that a modulation scheme for the carrier is 1024 quadrature amplitude modulation (QAM). A forward error correction code is a code pattern having a specific error correction capability. When the forward error correction code is used, an erroneous codeword can be found and located, and can be automatically corrected. The forward error correction code parameters herein generally include a corresponding codeword and bit rate.

(4) The terms "system" and "network" in the embodiments of this application may be used interchangeably. "A plurality of" means two or more. In view of this, "a plurality of" may also be understood as "at least two" in the embodiments of this application. "And/or" describes an association relationship for describing associated objects and indicates that three relationships may exist. For example, A and/or B may indicate the following three cases: Only A exists, both A and B exist, and only B exists. In addition, unless otherwise specified, ordinal numbers such as "first" and "second" mentioned in the embodiments of this application are intended to distinguish between a plurality of objects, but are not intended to limit a sequence, a time sequence, a priority, or an importance degree of the plurality of objects. In addition, in the embodiments of this application, to distinguish between a plurality of indication messages and a plurality of response messages, an indication message A, an indication message B, and an indication message C are used to represent indication messages having different functions, and a response message A and a response message B are used to represent response messages having different functions.

The following further describes the technical background of this application, to facilitate understanding.

Currently, a variation of a load and noise on a power line affects an actual channel capacity during data transmission on the power line. In this case, if a node uses a fixed set of modulation coding parameters to transmit data, a data transmission rate may fail to reach the actual channel capacity. In an existing solution, to resolve the foregoing problem, it is proposed that the node may equally divide an alternating current cycle into a plurality of time windows, and determine modulation coding parameters used for data transmission in different time windows. However, the actual channel capacity in the alternating current cycle does not necessarily vary at a same time interval. Therefore, even if time windows are obtained through equal division, it is difficult to adapt to a variation of the actual channel capacity. In addition, a rate at which the node transmits data through the power line cannot reach the actual channel capacity.

Figure 2:
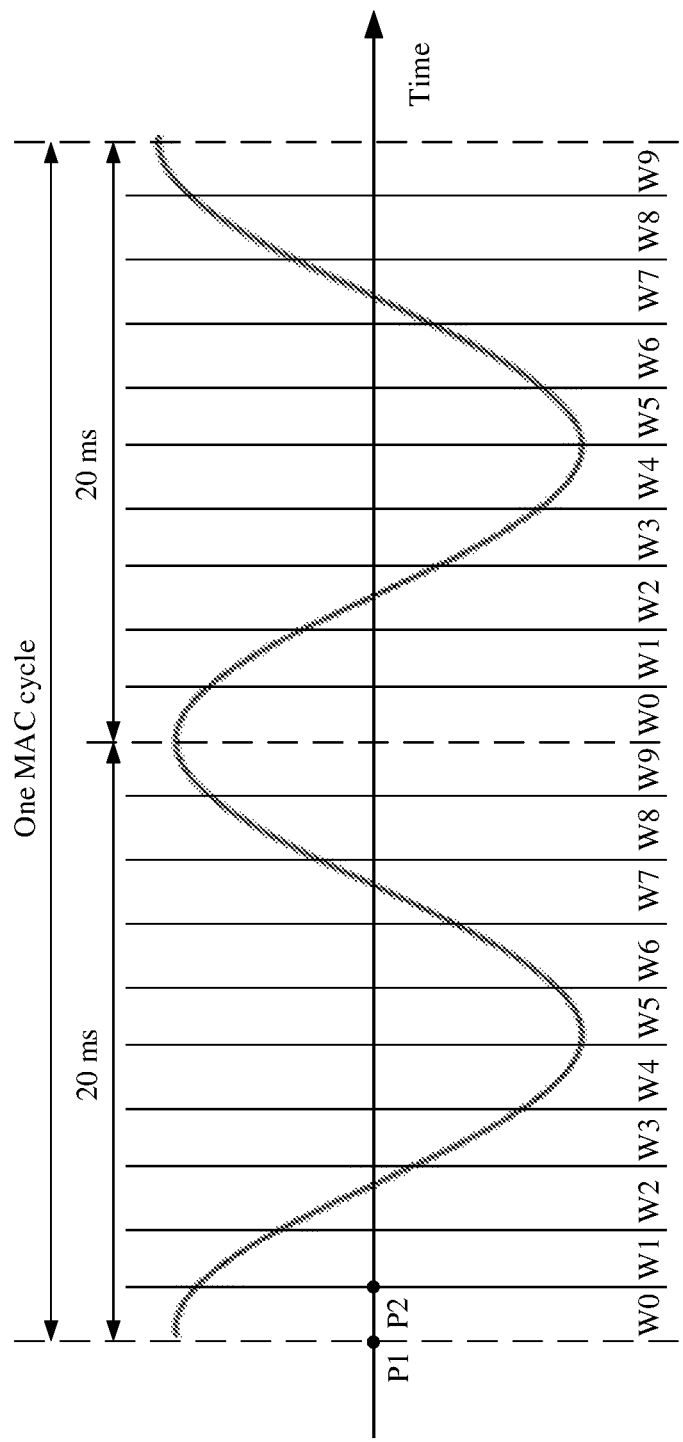
FIG. 2 is a schematic diagram of time windows obtained through division in the prior art.
Figure 3:
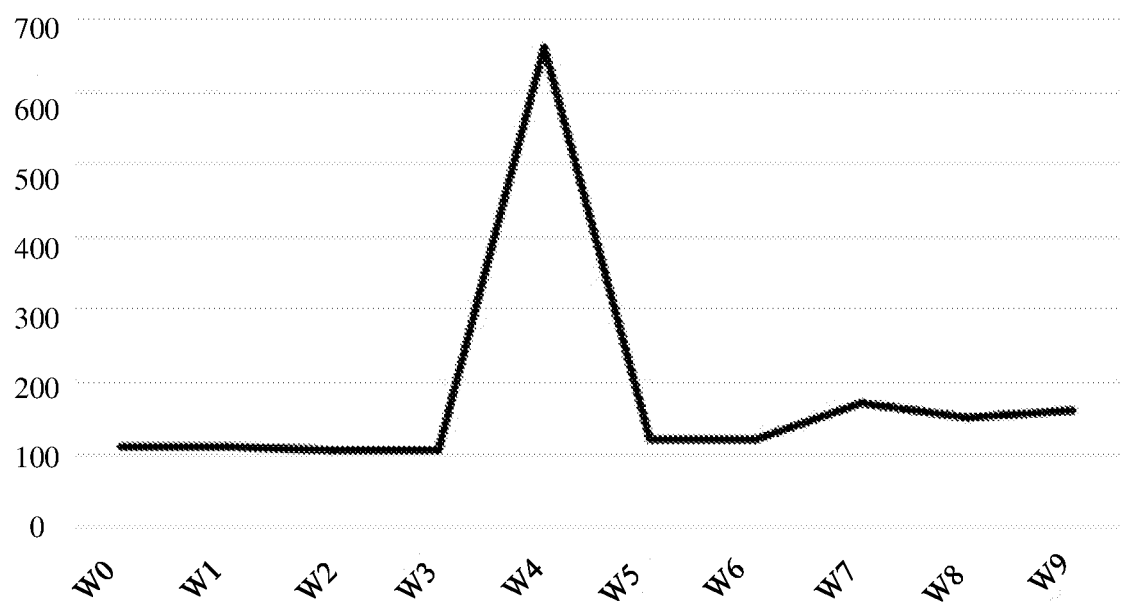
FIG. 3 is a schematic diagram of a rate at which data is transmitted in time windows obtained through division in the prior art.

For example, a specific channel environment in which the power line is used as a communication channel is assumed. When the alternating current cycle is equally divided into 10 time windows (as shown in FIG. 2), a curve shown in FIG. 3 may be obtained by testing rates at which the node transmits data by using corresponding modulation coding parameters in the time windows. W0 to W9 shown on a horizontal axis in a coordinate axis shown in FIG. 3 are 10 consecutive time windows in the alternating current cycle, and a vertical axis shows rates obtained through measurement in the time windows. A rate corresponding to each time window is a result obtained by dividing a quantity of actually transmitted bits in the time window by duration corresponding to the time window, and a unit of the rate may be megabit per second (Mbps). It can be learned from the rates obtained through measurement that, in the time windows obtained through equal division, only the rate at which the node transmits data in the time window W4 reaches a desirable value, and the rates at which the node transmits data in other time windows are relatively low.

In this application, to resolve the foregoing problem, the foregoing phenomenon is analyzed, and a reason for the phenomenon is concluded as follows: A channel in all the time windows except the time window W4 varies abruptly. This affects data demodulation of a receiver and reduces a data transmission rate. In other words, the desirable rate is obtained in the time window W4 because a channel is basically stable in the time window W4. The detailed analysis is as follows:

First, the time window W0 is used as an example. OFDM symbols are continuously sent in the time window W0, to analyze a variation of a channel response of the power line. When being detected in a silent condition, a channel noise level is stable and does not vary significantly. In this case, it may be preliminarily determined that the channel capacity varies due to the variation of the channel response. The channel response may include a channel amplitude response and a channel phase response. The following mainly uses the channel amplitude response as an example for description.

Figure 4A:
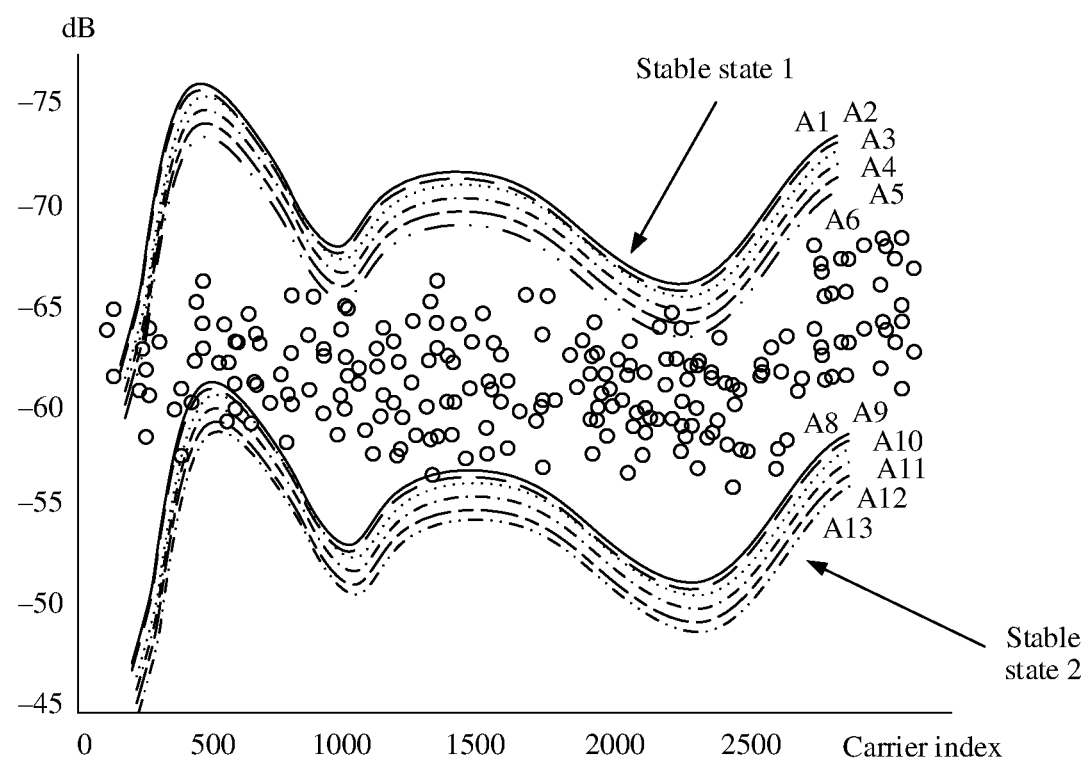
FIG. 4a is a schematic diagram 1 of a variation, of a channel amplitude response, obtained through testing in a time window obtained through division in the prior art.

Referring to FIG. 4a, the time window W0 includes OFDM symbols whose symbol indexes are 1 to 32. Curves A1 to A6 are respectively used to represent schematic diagrams of variations of channel amplitude responses in the OFDM symbol 1 to the OFDM symbol 6 in the time window W0. Curves A8 to A13 are respectively used to represent schematic diagrams of variations of channel amplitude responses in the OFDM symbol 8 to the OFDM symbol 13 in the time window W0. Discrete points denoted by " " in the figure are used to represent a schematic diagram of a variation of the channel amplitude response in the OFDM symbol 7. In a coordinate axis of the curves, a horizontal axis shows carrier indexes used to identify carriers, and a vertical axis shows amplitudes of channel amplitude responses. It should be understood that, in the figure, to distinguish between the curves, there is a gap between the curves. Actually, the curves A1 to A6 may be considered to be basically consistent, and the curves A8 to A13 may be considered to be basically consistent.

It can be learned from FIG. 4a that amplitudes of channel amplitude responses corresponding to any carrier in the OFDM symbol 1 to the OFDM symbol 6 are basically consistent. In other words, the amplitudes of the channel amplitude responses corresponding to any carrier in the OFDM symbol 1 to the OFDM symbol 6 are stable at a value. Therefore, the channel amplitude responses in the OFDM symbol 1 to the OFDM symbol 6 may be considered to be in a stable state, and this indirectly reflects that channel capacities in the OFDM symbol 1 to the OFDM symbol 6 are stable at a value. Likewise, the channel amplitude responses in the OFDM symbol 8 to the OFDM symbol 13 may also be considered to be in a stable state, and this indirectly reflects that channel capacities in the OFDM symbol 8 to the OFDM symbol 13 are stable at a value. Herein, it is assumed that the channel amplitude responses in the OFDM symbol 1 to the OFDM symbol 6 are in a stable state 1, and the channel amplitude responses in the OFDM symbol 8 to the OFDM symbol 13 are in a table state 2. When the channel amplitude responses are in a same stable state, the channel capacities are stable at a same value; when the channel amplitude responses are not in a same stable state, the channel capacities are stable at different values.

Further, a variation process of the channel amplitude response in the OFDM symbol 7 is analyzed. Amplitudes of the channel amplitude response corresponding to carriers obtained through calculation in the OFDM symbol 7 are discrete and irregular. This means that the channel amplitude response in the OFDM symbol 7 is in an unstable state, that is, a transition state. This may indirectly reflect that a channel in the OFDM symbol 7 is in a process of transition from the stable state 1 to the stable state 2.

Figure 4B:
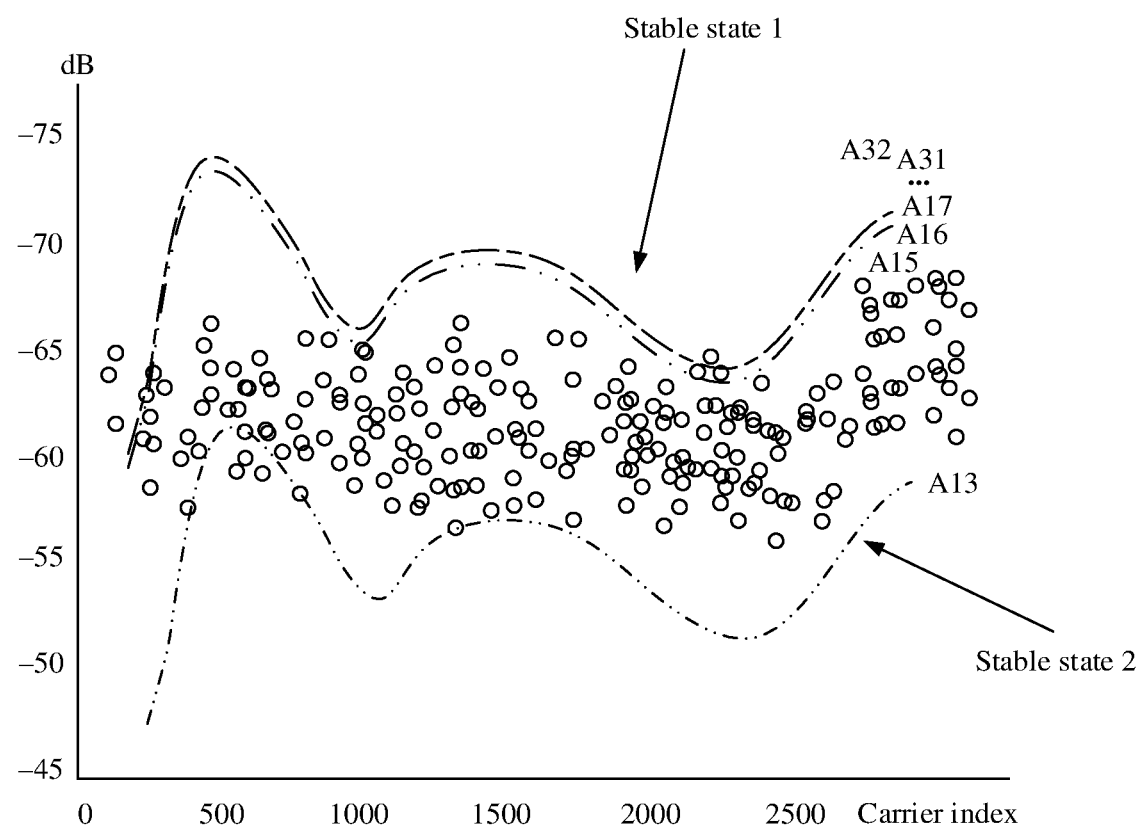
FIG. 4b is a schematic diagram 2 of a variation, of a channel amplitude response, obtained through testing in a time window obtained through division in the prior art.

Further, referring to FIG. 4b, a curve A13 is used to represent a schematic diagram of a variation of a channel amplitude response in the OFDM symbol 13. Curves A15 to A32 are respectively used to represent schematic diagrams of variations of channel amplitude responses in the OFDM symbol 15 to the OFDM symbol 32 in the time window W0 (The figure schematically shows only curves corresponding to some OFDM symbols in the OFDM symbol 15 to the OFDM symbol 32. For curves corresponding to other OFDM symbols that are not shown, refer to the curves shown in the figure). Discrete points denoted by " " in the figure are used to represent a schematic diagram of a variation of a channel amplitude response in the OFDM symbol 14. Amplitudes of the channel amplitude response corresponding to carriers in the OFDM symbol 14 are discrete and irregular, and the channel amplitude responses in the OFDM symbol 15 to the OFDM symbol 32 return to the stable state 1. This may indirectly reflect that a channel in the OFDM symbol 14 is in a process of transition from the stable state 2 to the stable state 1.

Figures 4C, 5:
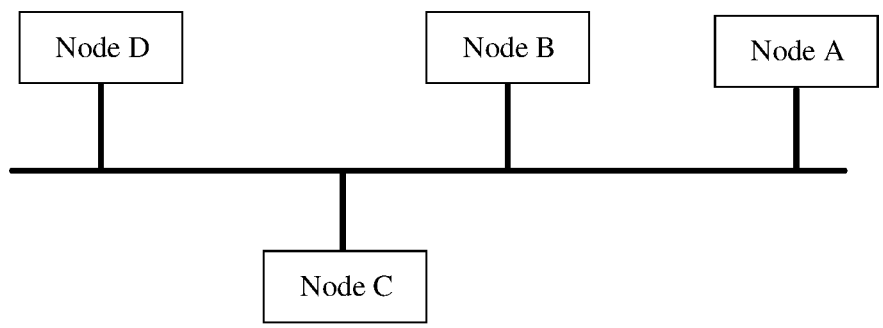
FIG. 4c is a schematic diagram of equal division into time windows in the prior art.
FIG. 5 is a schematic diagram of a basic network architecture of a power line network according to an embodiment of this application.

It can be learned from the foregoing analysis that the channel amplitude responses are not always in a stable state in the time window W0. Correspondingly, the channel capacity is not always stable, and may vary abruptly sometimes. By analogy, a case in which a channel capacity varies abruptly may also exist in another time window. For example, FIG. 4c shows a schematic diagram of division into time windows in an existing solution. 10 time windows W0 to W9 in an alternating current cycle each include 32 OFDM symbols. Each block represents one OFDM symbol, and the OFDM symbols are identified by symbol indexes 1 to 32. A transition process of a channel amplitude response (shown by shaded pails in the figure) occurs in an OFDM symbol 7 and an OFDM symbol 14 in each of all the time windows except the time window W4. It can be learned that fixed division into time windows cannot adapt to an actual channel variation, and consequently, a transmission rate at which data is transmitted in these time windows is limited.

With reference to the foregoing analysis result, this application provides a power line communication method and an apparatus, to resolve a problem in an existing solution that a rate at which a node transmits data through a power line hardly reaches an actual channel capacity.

Before the power line communication method provided in this application is described, a network architecture applicable to this application is first briefly described. FIG. 5 is a schematic diagram of an example of a basic network architecture of a power line network according to an embodiment of this application. Solid lines shown in FIG. 5 are used to represent power lines, and each node (Node) connected to the power line may be a node defined in the ITU-T G.hn standard or the IEEE Homeplug standard. The node may be specifically any communications device that can support communication through the power line, for example, a router, a gateway, a modem (DSL), an optical network terminal (ONT), a wireless access point (AP) in a home application scenario, or various sensors and intelligent devices in an enterprise application scenario or an internet of things scenario. When the power line is used as a channel for data transmission, the nodes in the power line network may transmit data through the power line.

Specifically, the nodes in the power line network may be classified into a master node and a slave node. In this embodiment of this application, a set of modulation coding parameters may be preconfigured for each of the master node and the slave node. In an initial power-on phase of the network, the master node may modulate a management signal based on the preconfigured modulation coding parameters, and then broadcast a modulated management signal to the slave node, where the management signal may carry configuration information, a time-frequency resource allocated to the slave node, and the like. After demodulating the received management signal based on the preconfigured modulation coding parameters and obtaining related information indicated in the management signal, the slave node may initiate a registration procedure to the master node. After the slave node and the master node complete the registration procedure, the master node may periodically or aperiodically send a sounding signal to the slave node. The sounding signal may be used by the slave node to perform channel estimation on a channel between the master node and the slave node, detect a variation of a channel status, obtain time windows through division, determine modulation coding parameters, and the like. Alternatively, the slave node may periodically or aperiodically request sending of a sounding signal. The sounding signal may be used by the master node or another slave node to perform channel estimation on a channel between the master node or the another slave node and the slave node to which the sounding signal is sent, detect a variation of a channel status, obtain time windows through division, determine modulation coding parameters, and the like. The sounding signal is generally a signal frame generated based on a pseudo-random sequence, for example, a PROBE frame defined in the ITU-T G.hn standard.

The following describes in detail the method provided in this application through specific embodiments.

Figure 6:
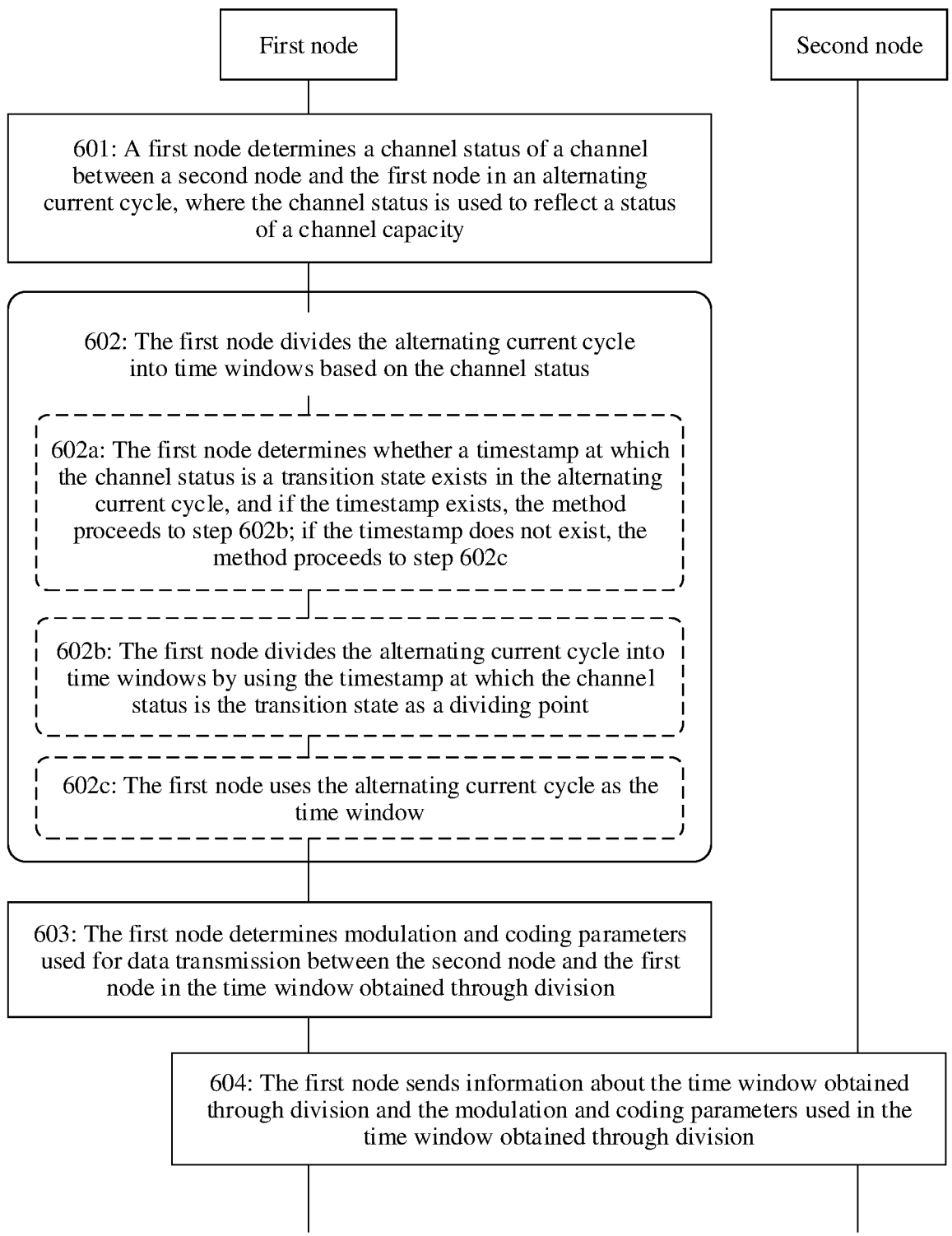
FIG. 6 is a schematic flowchart of a power line communication method according to an embodiment of this application.

FIG. 6 is a schematic flowchart of a power line communication method according to an embodiment of this application. The method includes the following steps.

Step 601: A first node determines a channel status of a channel between a second node and the first node in an alternating current cycle, where the channel status is used to reflect a status of a channel capacity.

In this embodiment of this application, it is assumed that the first node has received a sounding signal before performing step 601. The channel between the second node and the first node may be understood as a channel used when the second node and the first node transmit data through a power line. The first node serves as a receive end, and the second node serves as a transmit end. The second node may modulate to-be-sent data by using a previously determined time window and corresponding modulation coding parameters in a current alternating current cycle, and then send modulated data to the first node. Correspondingly, the first node may demodulate the received data by using a previously determined time window and the corresponding modulation coding parameters. The previously determined time window is obtained through division and the modulation coding parameters corresponding to the time window obtained through division are determined by the first node after receiving the sounding signal and detecting the channel status of the channel between the second node and the first node.

In this embodiment of this application, when receiving the data from the second node in the current alternating current cycle, the first node may detect the channel status of the channel between the second node and the first node, and may indirectly obtain the status of the channel capacity by analyzing the channel status. The channel status may include at least one of a channel response and a channel noise level, and the channel response may include a channel amplitude response and/or a channel phase response.

Step 602: The first node divides the alternating current cycle into time windows based on the channel status.

In this embodiment of this application, the channel status can reflect the status of the channel capacity. Therefore, a variation of the channel capacity may be analyzed based on the detected channel status, and then the alternating current cycle is divided into time windows based on the variation of the channel capacity obtained through analysis. For a specific implementation process, refer to step 602a to step 602c.

Step 602a: The first node determines whether a timestamp at which the channel status is a transition state exists in the alternating current cycle, where that the channel status is the transition state is used to indicate that the channel capacity varies.

If the timestamp exists, the method proceeds to step 602b. If the timestamp does not exist, the method proceeds to step 602c.

In this embodiment of this application, when detecting the channel status of the channel between the second node and the first node in the alternating current cycle, the first node may divide the alternating current cycle into a plurality of time periods of a preset length, and compare a variation of channel statuses in two adjacent time periods, to determine whether a transition process of the channel status occurs in the two adjacent time periods. The preset length is, for example, duration corresponding to one OFDM symbol or duration corresponding to one slot. Certainly, in actual application, the preset length may be further shortened, for example, may be duration corresponding to a quarter of one OFDM symbol, to improve detection precision.

In an example in this application, the first node may determine, by comparing a variation of channel responses in two adjacent time periods, whether a transition process of the channel status occurs in the two adjacent time periods.

Specifically, the first node may determine, by determining whether a quantity of carriers that meet a preset condition in two adjacent time periods in the alternating current cycle is greater than a first preset value, whether the timestamp at which the channel status is the transition state exists. The preset condition is that a difference between amplitudes of channel responses corresponding to the carrier in the two adjacent time periods is greater than a second preset value. When the quantity of carriers that meet the preset condition in the two adjacent time periods in the alternating current cycle is greater than the first preset value, it may reflect that the channel response in one of the two adjacent time periods greatly fluctuates compared with the channel response in the other time period. Therefore, a critical point of the two adjacent time periods may be determined as the timestamp at which the channel status is the transition state. When the quantity of carriers that meet the preset condition in the two adjacent time periods in the alternating current cycle is less than or equal to the first preset value, it may reflect that the channel response in one of the two adjacent time periods slightly differs from the channel response in the other time period. Therefore, the channel status in the two adjacent time periods may be considered as a stable state.

Alternatively, the first node may determine, by determining whether a difference between average values of amplitudes of channel responses corresponding to N carriers in two adjacent time periods is greater than a third preset value, whether the timestamp at which the channel status is the transition state exists. N is a positive integer. When the difference between the average values of the amplitudes of the channel responses corresponding to the N carriers in the two adjacent time periods is greater than the third preset value, it may reflect that the channel response in one of the two adjacent time periods greatly fluctuates compared with the channel response in the other time period. Therefore, a critical point of the two adjacent time periods is determined as the timestamp at which the channel status is the transition state. When the difference between the average values of the amplitudes of the channel responses corresponding to the N carriers in the two adjacent time periods is less than or equal to the third preset value, it may reflect that the channel response in one of the two adjacent time periods slightly differs from the channel response in the other time period. Therefore, the channel status in the two adjacent time periods may be considered as a stable state.

In another example in this application, the first node may determine, by comparing a variation of channel noise levels in two adjacent time periods, whether a transition process of the channel status occurs in the two adjacent time periods.

Specifically, when determining that a difference between the channel noise levels in the two adjacent time periods in the alternating current cycle is greater than a fourth preset value, the first node may determine a critical point of the two adjacent time periods as the timestamp at which the channel status is the transition state. When a difference between the channel noise levels in the two adjacent time periods in the alternating current cycle is less than or equal to a fourth preset value, it may be determined that the channel status in the two adjacent time periods is a stable state. The first node may detect the channel noise level in the following two manners:

Manner 1: A variation of a signal-to-noise ratio can indirectly reflect a variation of the channel noise level. Therefore, the first node may estimate a signal-to-noise ratio on the channel between the second node and the first node based on a signal received from the second node, record a corresponding signal-to-noise ratio in each time period, and further analyze a variation of corresponding signal-to-noise ratios in two adjacent time periods, to determine the variation of the channel noise level.

Manner 2: When the second node keeps silent, that is, the second node sends no signal to the first node, a signal received by the first node is a noise signal on the channel. Therefore, in this case, the first node may analyze an energy variation of signals received in two adjacent time periods, to determine the variation of the channel noise level.

Figure 7A:
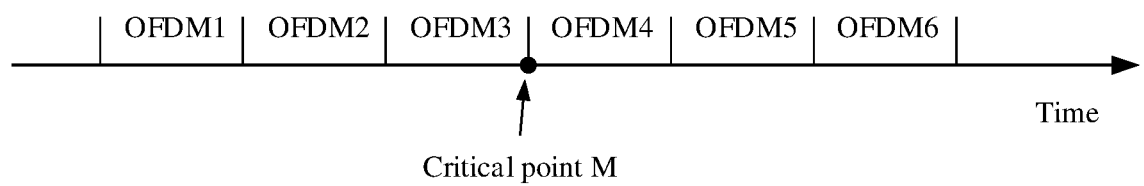
FIG. 7a is a schematic diagram of description of a critical point of two adjacent time periods according to an embodiment of this application.

A critical point of two adjacent time periods is described herein by using an example in which the time period is represented by one OFDM symbol. Referring to FIG. 7a, locations of an OFDM symbol 1 to an OFDM symbol 6 in time domain are shown in the figure. It is assumed that the channel response or the channel noise level in the OFDM symbol 4 greatly fluctuates compared with the channel response or the channel noise level in the OFDM symbol 4. In this case, a critical point M of the OFDM symbol 3 and the OFDM symbol 4 may represent the timestamp at which the channel status is the transition state.

Step 602b: The first node divides the alternating current cycle into time windows by using the timestamp at which the channel status is the transition state as a dividing point.

There may be at least one timestamp at which the channel status is the transition state. In specific implementation, the alternating current cycle may be divided into time windows by using each timestamp as one dividing point or using several timestamps from the at least one timestamp as dividing points. For example, referring to FIG. 7b, an OFDM symbol 1 to an OFDM symbol 32 are time periods in the alternating current cycle, and locations of the OFDM symbol 1 to the OFDM symbol 32 in time domain are shown in the figure. If a transition process of a channel status occurs on the OFDM symbol 7 and the OFDM symbol 14, M1 to M4 are timestamps at which the channel status is the transition state. Because M1 and M2 are relatively close to each other, and M3 and M4 are relatively close to each other, M2 and M4 may be used as dividing points for performing division into time windows.

In this embodiment of this application, division into time windows may be performed in the following two manners. It should be noted that, every two adjacent timestamps at which the channel status is the transition state described below are not all determined timestamps at which the channel status is the transition state, but are timestamps selected as dividing points for performing division into time windows.

Manner 1: The first node uses a time period between every two adjacent timestamps at which the channel status is the transition state in the alternating current cycle as a time window. A time window obtained through division may include consecutive time periods.

Figure 7B:
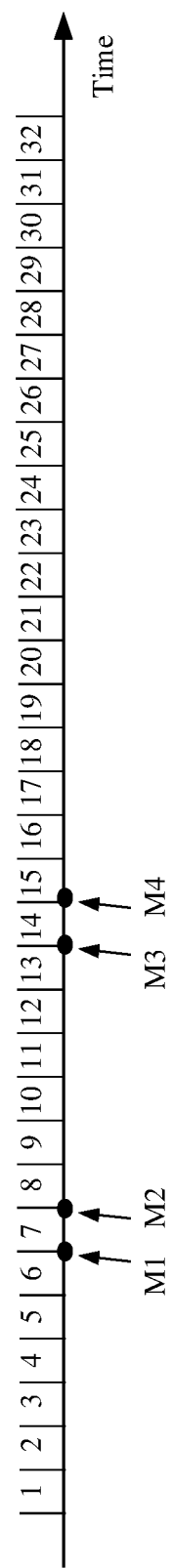
FIG. 7b is a schematic diagram of description of division into time windows by using a timestamp at which a channel status is a transition state as a dividing point according to an embodiment of this application.

For example, still referring to FIG. 7b, it is assumed that M2 and M4 are selected as dividing points to perform division into time windows. In this case, the OFDM symbol 1 to the OFDM symbol 32 may be divided into three time windows: a time window 1 includes the OFDM symbol 1 to the OFDM symbol 7, a time window 2 includes the OFDM symbol 8 to the OFDM symbol 14, and a time window 3 includes the OFDM symbol 15 to the OFDM symbol 32.

Manner 2: The first node uses, in a time period between every two adjacent timestamps at which the channel status is the transition state, a time period in which the channel status is a same stable state as a time window. A time window obtained through division may include inconsecutive time periods.

For example, still referring to FIG. 7*b*, it is assumed that M2 and M4 are selected as dividing points to perform division into time windows, the channel status in the OFDM symbol 1 to the OFDM symbol 6 is a stable state 1, the channel status in the OFDM symbol 8 to the OFDM symbol 13 is a stable state 2, and the channel status in the OFDM symbol 15 to the OFDM symbol 32 is the stable state 1. In this case, time windows are obtained through division in manner 2: a time window 1 including the OFDM symbol 1 to the OFDM symbol 7, and the OFDM symbol 15 to the OFDM symbol 32; and a time window 2 including the OFDM symbol 8 to the OFDM symbol 14.

A smaller quantity of time windows is obtained through division in manner 2 than in manner 1. Correspondingly, a smaller quantity of modulation coding parameters needs to be maintained, and system implementation is facilitated.

In the foregoing two examples, the OFDM symbol in which the channel status is the transition state is located at the tail of a time window during division, to maximally reduce impact on transmission performance. Certainly, in actual application, the OFDM symbol in which the channel status is the transition state may be directly discarded, or the OFDM symbol in which the channel status is the transition state may be separately classified into one time window.

Step 602*c*: The first node uses the alternating current cycle as the time window.

When no timestamp at which the channel status is the transition state exists in the alternating current cycle, it may be considered that no transition process of the channel status occurs in the alternating current cycle. Therefore, the alternating current cycle may be used as the time window.

Step 603: The first node determines modulation coding parameters used for data transmission between the second node and the first node in the time window obtained through division.

Specifically, after receiving a response message A that is sent by the second node and that is used to indicate successful receiving, the first node may perform, for the time window obtained through division, calculation on channel estimation, a signal-to-noise ratio, a bit loading quantity, and a forward error correction code, to obtain the modulation coding parameters. For how to perform modulation and demodulation by using the modulation coding parameters during data transmission between the second node and the first node, refer to the prior art. Details are not described herein again.

Step 604: The first node sends information about the time window obtained through division and the modulation coding parameters used in the time window obtained through division to the second node.

The information about the time window obtained through division includes a start timestamp and an end timestamp of the time window obtained through division; or includes a start timestamp of the time window obtained through division and duration corresponding to the time window obtained through division.

In this embodiment of this application, that the first node sends information about the time window obtained through division and the modulation coding parameters used in the time window obtained through division to the second node may include the following two implementations:

Implementation 1: After performing step 602 and step 603, that is, after dividing the alternating current cycle into time windows and determining the modulation coding parameters used for data transmission between the second node and the first node in the time window obtained through division, the first node may notify the second node of the information about the time window obtained through division and the modulation coding parameters corresponding to the time window obtained through division. This implementation simplifies a signaling exchange procedure, and reduces signaling overheads.

Specifically, the first node may send an indication message A that includes the information about the time window obtained through division and the modulation coding parameters used in the time window obtained through division to the second node, to indicate the information about the time window obtained through division and the modulation coding parameters used in the time window obtained through division to the second node. It should be noted that, after receiving the response message A that is sent by the second node and that is used to indicate that the indication message A is successfully received, the first node may determine that the information about the time window obtained through division and the modulation coding parameters used in the time window obtained through division take effect. Correspondingly, to synchronize the time window obtained through division with the first node and update the modulation coding parameters used in the time window obtained through division, the second node may determine, after a delay of a period of time after sending the response message A to the first node, that the information about the time window obtained through division and the modulation coding parameters used in the time window obtained through division take effect. Further, the first node and the second node may re-perform division into time windows in a next alternating current cycle based on the newly effective information about the time window obtained through division, and may transmit data, in the time window obtained through division, by using the newly effective modulation coding parameters.

Implementation 2: After performing step 602, that is, after dividing the alternating current cycle into time windows, the first node may send the information about the time window obtained through division to the second node. Further, after performing step 603, that is, after determining the modulation coding parameters used for data transmission between the second node and the first node in the time window obtained through division, the first node sends the modulation coding parameters used in the time window obtained through division to the second node.

Specifically, the first node may send an indication message B that includes the information about the time window obtained through division to the second node, to indicate the information about the time window obtained through division to the second node. It should be noted that after determining the information about the time window obtained through division and notifying the information about the time window obtained through division to the second node, the first node may determine, after receiving a response message B that is sent by the second node and that is used to indicate that the indication message B is successfully received, that the information about the time window obtained through division takes effect. Correspondingly, to synchronize the time window obtained through division with the first node, the second node may determine, after a delay of a period of time after sending the response message B to the first node, the information about the time window obtained through division takes effect. Then the first node and the second node may re-perform division into time windows in a next alternating current cycle based on the newly effective information about the time window obtained through division.

Further, after receiving the response message B sent by the second node, the first node may determine the modulation coding parameters used in the time window obtained through division. Then, the first node may send an indication message C that includes the modulation coding parameters used in the time window obtained through division to the second node, to indicate the modulation coding parameters used in the time window obtained through division to the second node. It should be noted that, after receiving a response message C that is sent by the second node and that is used to indicate that the indication message C is successfully received, the first node may determine that the modulation coding parameters used in the time window obtained through division take effect. Correspondingly, to synchronize the modulation coding parameters used in time window obtained through division with the first node, the second node may determine, after a delay of a period of time after sending the response message C, that the received modulation coding parameters take effect. Further, the first node and the second node may transmit data by using the newly effective modulation coding parameters in the time window obtained through division in a next alternating current cycle.

In addition, in this embodiment of this application, if the first node further receives, in the current alternating current cycle, data sent by another node, the first node may further detect a channel status of a channel on which data is transmitted between the another node and the first node, and further perform division into time windows and calculate modulation coding parameters. For a specific process, refer to the foregoing steps. It should be noted that, in this embodiment of this application, the first node, the second node, and the another node may be any node in a power line network, and communication between these nodes may be communication between a master node and a slave node, or may be communication between slave nodes. This is not limited in this application.

In this embodiment of this application, a variation of a channel status of a channel between two nodes in the alternating current cycle is determined, and then the alternating current cycle is divided into time windows based on the variation of the channel status. Compared with an existing solution in which time windows are obtained through equal division, the implementation in the foregoing method can better reflect a variation of an actual channel capacity, so that the modulation coding parameters that are used for data transmission between the two nodes and that are determined in the time window obtained through division is more accurate, and a transmission rate at which data is to be transmitted can be improved and maximally approach the actual channel capacity.

The following compares the solution provided in this application with the existing solution of division into time windows, to describe technical effects that can be achieved by the solution provided in this application.

It can be learned from the cases in FIG. 2 to FIG. 4b that, in the existing solution, the alternating current cycle is equally divided into 10 time windows. OFDM symbols (shaded parts shown in FIG. 4c) in which the channel response varies greatly exist in all the time windows except the time window W4. When data is transmitted in these time windows by using corresponding modulation coding parameters, only a data transmission rate in the time window W4 can reach a relatively good value.

When the time windows are obtained through division based on the channel status provided in this application, the following two cases exist:

Case 1: When a time period between every two adjacent timestamps at which the channel status is the transition state is used as a time window, obtained time windows may be shown in FIG. 8a. The alternating current cycle is divided into 18 time windows, and numerals 0 to 17 in the figure are used to identify the time windows. In this case, the time windows includes consecutive OFDM symbols. The initial eight consecutive OFDM symbols denoted by "PRE" indicate that these OFDM symbols are grouped into a previous alternating current cycle. Channel statuses in the eight OFDM symbols and an OFDM symbol at the tail of the previous alternating current cycle are all in a stable state, and therefore, it is appropriate to group these symbols into a same time window.

Figure 8B:
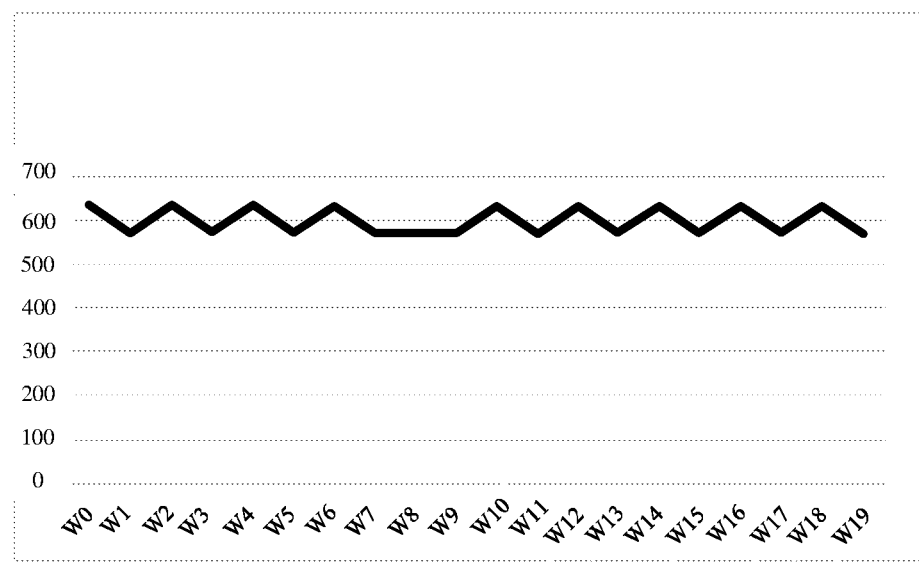
FIG. 8b is a schematic diagram 1 of a rate at which data is transmitted in time windows obtained through division according to an embodiment of this application.

Further, a curve shown in FIG. 8b may be obtained by testing rates at which data is transmitted by using corresponding modulation coding parameters in the time windows. W0 to W17 shown on a horizontal axis are 18 time windows obtained through division according to the solution provided in this application, and the vertical axis shows rates measured in the time windows. Compared with the rates shown in FIG. 3 obtained through the existing solution, certainly, the rates at which data is transmitted in case 1 are significantly improved, and can maximally approach an actual channel capacity.

Case 2: From a time period between every two adjacent timestamps at which the channel status is the transition state, a time period in which the channel status is a same stable state is used as a time window, and obtained time windows may be shown in FIG. 9a. The alternating current cycle is divided into two time windows, numerals 0 and 1 in the figure are used to identify time windows. In this case, the time windows includes inconsecutive OFDM symbols. A channel status in a time window 1 may be considered as the stable state 1, and a channel status in a time window 2 may be considered as a stable state 2.

Figure 9B:
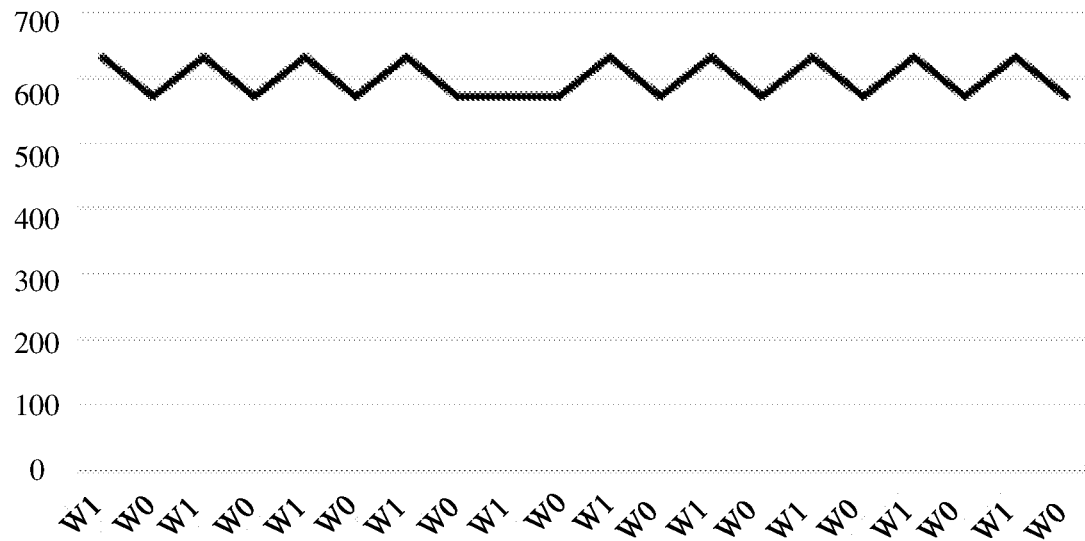
FIG. 9b is a schematic diagram 2 of a rate at which data is transmitted in time windows obtained through division according to an embodiment of this application.

Further, a curve shown in FIG. 9b may be obtained by testing rates at which data is transmitted by using corresponding modulation coding parameters in the time windows. W0 and W1 shown on a horizontal axis are two time windows obtained through division according to the solution provided in this application, and the vertical axis shows rates measured in the time windows. Compared with the rates shown in FIG. 3 obtained through the existing solution, the rates at which data is transmitted in case 2 may also be significantly improved, and can maximally approach an actual channel capacity.

Based on a same technical concept, the following describes, with reference to the accompanying drawings, a communications apparatus provided in the embodiments of this application.

An embodiment of this application provides a communications apparatus. The apparatus may be the first node in the foregoing method embodiment, or may be a chip in the first node. The first node or the chip has a function of implementing the foregoing method embodiment. The function may be implemented by using hardware, or implemented by hardware executing corresponding software. The hardware or the software includes one or more modules corresponding to the foregoing function. The modules may be software and/or hardware.

Figure 10:
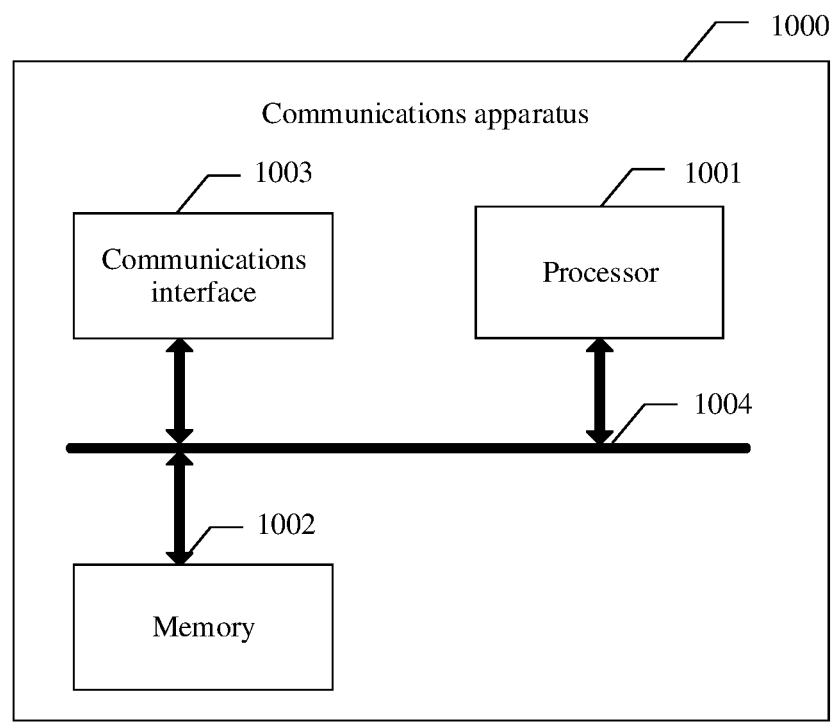
FIG. 10 is a schematic structural diagram of a communications apparatus 1000 according to an embodiment of this application.

FIG. 10 is a schematic structural diagram of a communications apparatus 1000 according to an embodiment of this application. The communications apparatus 1000 includes a processor 1001 and a memory 1002. The processor 1001 is configured to support the communications apparatus 1000 in performing the function in the foregoing method embodiment. The memory 1002 is configured to store a computer instruction necessary for implementing the power line communication method in the foregoing method embodiment. Optionally, the communications apparatus 1000 further includes a communications interface 1003, and the communications interface 1003 is configured to support a function of the communications apparatus 1000 of sending and receiving a message. The processor 1001, the memory 1002, and the communications interface 1003 are connected. The processor 1001 is configured to execute the computer instruction stored in the memory 1002, and control the communications interface 1003 to send and receive a message, to implement the power line communication method in the foregoing method embodiment.

Specifically, the processor 1001 is configured to: determine a channel status of a channel between a second node and the communications apparatus 1000 in an alternating current cycle, where the channel status is used to reflect a status of a channel capacity; divide the alternating current cycle into time windows based on the channel status, and determine modulation coding parameters used for data transmission between the second node and the communications apparatus 1000 in the time window obtained through division; and control the communications interface 1003 to send information about the time window obtained through division and the modulation coding parameters used in the time window obtained through division to the second node.

In a possible design, after dividing the alternating current cycle into time windows, the processor 1001 may control the communications interface 1003 to send the information about the time window obtained through division to the second node. Further, after determining the modulation coding parameters used for data transmission between the second node and the communications apparatus 1000 in the time window obtained through division, the processor 1001 controls the communications interface 1003 to send the modulation coding parameters used in the time window obtained through division to the second node.

In a possible design, when dividing the alternating current cycle into time windows based on the channel status, the processor 1001 is specifically configured to: determine whether a timestamp at which the channel status is a transition state exists in the alternating current cycle, where that the channel status is the transition state is used to indicate that the channel capacity varies; and if the timestamp exists, divide the alternating current cycle into time windows by using the timestamp at which the channel status is the transition state as a dividing point; or if the timestamp does not exist, use the alternating current cycle as the time window.

Specifically, the channel status includes at least one of a channel response or a channel noise level, and the channel response is a channel amplitude response and/or a channel phase response.

Optionally, if the channel status includes the channel response, when determining whether the timestamp at which the channel status is the transition state exists in the alternating current cycle, the processor 1001 is specifically configured to: if the processor determines that a quantity of carriers that meet a preset condition in two adjacent time periods in the alternating current cycle is greater than a first preset value, determine a critical point of the two adjacent time periods as the timestamp at which the channel status is the transition state, where the preset condition is that a difference between amplitudes of channel responses corresponding to the carrier in the two adjacent time periods is greater than a second preset value; or if the processor determines that a difference between average values of amplitudes of channel responses corresponding to N carriers in two adjacent time periods is greater than a third preset value, determine a critical point of the two adjacent time periods as the timestamp at which the channel status is the transition state, where n is a positive integer.

Optionally, if the channel status includes the channel noise level, when determining whether the timestamp at which the channel status is the transition state exists in the alternating current cycle, the processor 1001 is specifically configured to: if the processor determines that a difference between channel noise levels in two adjacent time periods in the alternating current cycle is greater than a fourth preset value, determine a critical point of the two adjacent time periods as the timestamp at which the channel status is the transition state.

In a possible design, when dividing the alternating current cycle into time windows, the processor 1001 is specifically configured to: use a time period between every two adjacent timestamps at which the channel status is the transition state in the alternating current cycle as a time window, where that the channel status is the transition state is used to indicate that the channel capacity varies; or use, in a time period between every two adjacent timestamps at which the channel status is the transition state, a time period in which the channel status is a same stable state as a time window, where that the channel status is the same stable state is used to indicate that the channel capacity is stable at a same value.

It should be noted that the processor 1001 in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor 1001 may be a combination of processors implementing a computing function, for example, a combination of one or more microprocessors, or a combination of the DSP and a microprocessor. The memory 1002 may be a non-volatile memory, such as a hard disk drive (HDD) or a solid-state drive (SSD), or may be a volatile memory, such as a random access memory (RAM). The memory 1002 may alternatively be any other medium that can be configured to carry or store expected program code in a form of an instruction or a data structure and that can be accessed by a computer, but is not limited thereto. The memory 1002 may be integrated into the processor 1001, or may be disposed separately from the processor 1001.

A specific connection medium between the processor 1001, the memory 1002, and the communications interface 1003 is not limited in this embodiment of this application. In the embodiments of this application, the processor 1001, the memory 1002, and the communications interface 1003 are connected through a bus 1004 in FIG. 10. The bus is represented by a bold line in FIG. 10. The connection manner between other components is merely an example for description, and is not limited thereto. The bus may be classified into an address bus, a data bus, a control bus, and the like. For ease of representation, only one bold line is used to represent the bus in FIG. 10, but this does not mean that there is only one bus or only one type of bus.

Figure 11:
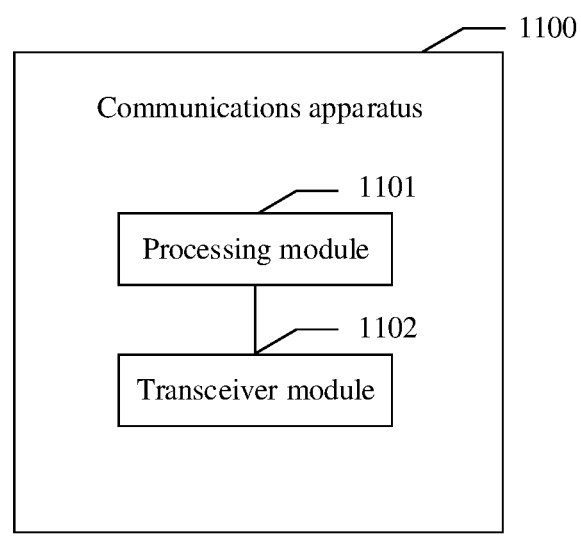
FIG. 11 is a schematic structural diagram of a communications apparatus 1100 according to an embodiment of this application.

In addition, the foregoing communications apparatus 1000 may further be implemented by using a logical unit. FIG. 11 is a schematic structural diagram of a communications apparatus 1100 according to an embodiment of this application. The communication apparatus 1100 includes a processing module 1101 and a transceiver module 1102. The processing module 1101 corresponds to the processor 1001 in the communications apparatus 1000, and the transceiver module 1102 corresponds to the communications interface 1003 in the apparatus 1000, and may be separately configured to implement the power line communication method in the foregoing method embodiment. For a specific implementation process, refer to related descriptions in the foregoing method embodiment and the foregoing communications apparatus 1000. Details are not described herein again. It should be understood that in this embodiment of this application, division into modules is an example, and is merely logical function division. During actual implementation, there may be another division manner. In addition, function modules in each embodiment of this application may be integrated into one processor, or each of the modules may exist alone physically, or two or more modules may be integrated into one module.

An embodiment of this application further provides a computer storage medium, where the computer storage medium stores a computer-readable instruction. When a computer reads and executes the computer-readable instruction, the computer can implement the power line communication method in the foregoing method embodiment.

An embodiment of this application further provides a computer program product. The computer program product includes a computer program, and the computer program is used to perform the power line communication method in the foregoing method embodiment.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams. These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:
1. A method, comprising:
   determining, by a first node, a channel status of a channel between a second node and the first node in an alternating current cycle, wherein the channel status reflects a status of a channel capacity;
   dividing, by the first node, the alternating current cycle into time windows based on the channel status;
   determining, by the first node, modulation coding parameters used for data transmission between the second node and the first node in the time windows obtained through division; and
   sending, by the first node to the second node, information about the time windows obtained through division and the modulation coding parameters used in the time windows obtained through division;
   wherein dividing the alternating current cycle into the time windows based on the channel status comprises:
      determining, by the first node, whether a timestamp at which the channel status is a transition state exists in the alternating current cycle, wherein that the channel status is the transition state indicates that the channel capacity varies; and
      in response to determining the timestamp exists, dividing, by the first node, the alternating current cycle into the time windows using the timestamp at which the channel status is the transition state as a dividing point; and
      in response to determining the timestamp does not exist, using, by the first node, the alternating current cycle as the time windows; and
   wherein the channel status comprises a channel response, and determining, by the first node, whether the timestamp at which the channel status is the transition state exists in the alternating current cycle comprises:
      in response to the first node determining that a quantity of carriers that meet a preset condition in two adjacent time periods in the alternating current cycle is greater than a first preset value, determining, by the first node, a critical point of the two adjacent time periods as the timestamp at which the channel status is the transition state, wherein the preset condition is that a difference between amplitudes of channel responses corresponding to the respective carrier in the two adjacent time periods is greater than a second preset value; or in response to the first node determining that a difference between average values of amplitudes of channel responses corresponding to N carriers in two adjacent time periods is greater than a third preset value, determining, by the first node, a critical point of the two adjacent time periods as the timestamp at which the channel status is the transition state, wherein n is a positive integer.

2. The method according to claim 1, wherein sending, by the first node to the second node, the information about the time windows obtained through division and the modulation coding parameters used in the time windows obtained through division comprises:

after dividing the alternating current cycle into time windows, sending, by the first node, the information about the time windows obtained through division to the second node; and after determining the modulation coding parameters used for data transmission between the second node and the first node in the time windows obtained through division, sending, by the first node, the modulation coding parameters used in the time windows obtained through division to the second node.

3. The method according to claim 1, wherein dividing, by the first node, the alternating current cycle into the time windows comprises:

using, by the first node, time periods between every two adjacent timestamps at which the channel status is the transition state in the alternating current cycle as the time windows, wherein the channel status being the transition state indicates that the channel capacity varies; or using, by the first node, among time periods between every two adjacent timestamps at which the channel status is the transition state, time periods in which the channel status is a same stable state as the time windows, wherein that the channel status is the same stable state indicates that the channel capacity is stable at a same value.

4. The method according to claim 1, wherein the channel status further comprises a channel noise level, and determining, by the first node, whether a timestamp at which the channel status is the transition state exists in the alternating current cycle comprises:

in response to the first node determining that a difference between channel noise levels in another two adjacent time periods in the alternating current cycle is greater than a fourth preset value, determining, by the first node, a critical point of the another two adjacent time periods as another timestamp at which the channel status is the transition state.

5. An apparatus, comprising:

a non-transitory memory storing a computer instruction; and a processor, wherein the processor is configured to invoke the computer instruction stored in the non-transitory memory to:

determining a channel status of a channel between a second node and the apparatus in an alternating current cycle, wherein the channel status reflects a status of a channel capacity;

dividing the alternating current cycle into time windows based on the channel status;

determining modulation coding parameters used for data transmission between the second node and the apparatus in the time windows obtained through division; and sending information about the time windows obtained through division and the modulation coding parameters used in the time windows obtained through division to the second node;

wherein the processor being configured to invoke the computer instruction stored in the non-transitory memory to divide the alternating current cycle into the time windows based on the channel status comprises the processor being configured to invoke the computer instruction stored in the non-transitory memory to:

determine whether a timestamp at which the channel status is a transition state exists in the alternating current cycle, wherein that the channel status is the transition state indicates that the channel capacity varies;

in response to determining the timestamp exists, divide the alternating current cycle into the time windows using the timestamp at which the channel status is the transition state as a dividing point; and in response to determining the timestamp does not exist, use the alternating current cycle as the time windows; and wherein the channel status comprises a channel response, and the processor being configured to invoke the computer instruction stored in the non-transitory memory to determine whether the timestamp at which the channel status is the transition state exists in the alternating current cycle comprises the processor being configured to invoke the computer instruction stored in the non-transitory memory to:

in response to determining that a quantity of carriers that meet a preset condition in two adjacent time periods in the alternating current cycle is greater than a first preset value, determine a critical point of the two adjacent time periods as the timestamp at which the channel status is the transition state, wherein the preset condition is that a difference between amplitudes of channel responses corresponding to the respective carrier in the two adjacent time periods is greater than a second preset value; or in response to determining that a difference between average values of amplitudes of channel responses corresponding to N carriers in two adjacent time periods is greater than a third preset value, determine a critical point of the two adjacent time periods as the timestamp at which the channel status is the transition state, wherein n is a positive integer.

6. The apparatus according to claim 5, wherein the processor being configured to invoke the computer instruction stored in the non-transitory memory to send the information about the time windows obtained through division and the modulation coding parameters used in the time windows obtained through division to the second node, comprises the processor being configured to invoke the computer instruction stored in the non-transitory memory to:

after dividing the alternating current cycle into time windows, send the information about the time windows obtained through division to the second node; and after determining the modulation coding parameters used for data transmission between the second node and the apparatus in the time windows obtained through division, send the modulation coding parameters used in the time windows obtained through division to the second node.

7. The apparatus according to claim 5, wherein the processor being configured to invoke the computer instruction stored in the non-transitory memory to divide the alternating current cycle into time windows comprises the processor being configured to invoke the computer instruction stored in the non-transitory memory to:
use time periods between every two adjacent timestamps at which the channel status is the transition state in the alternating current cycle as the time windows, wherein that the channel status is the transition state indicates that the channel capacity varies; or
use, among time periods between every two adjacent timestamps at which the channel status is the transition state, time periods in which the channel status is a same stable state as the time windows, wherein that the channel status is the same stable state indicates that the channel capacity is stable at a same value.

8. The apparatus according to claim 5, wherein the channel status further comprises a channel noise level, and the processor being configured to invoke the computer instruction stored in the non-transitory memory to determine whether the timestamp at which the channel status is the transition state exists in the alternating current cycle comprises the processor being configured to invoke the computer instruction stored in the non-transitory memory to:
in response to determining that a difference between channel noise levels in another two adjacent time periods in the alternating current cycle is greater than a fourth preset value, determine a critical point of the another two adjacent time periods as another timestamp at which the channel status is the transition state.

9. A non-transitory computer storage medium, wherein the non-transitory computer storage medium comprises a computer-readable instruction, and when a computer executes the computer-readable instruction, the computer is caused to:
determine a channel status of a channel between a second node and a first node in an alternating current cycle, wherein the channel status reflects a status of a channel capacity;
divide the alternating current cycle into time windows based on the channel status;
determine modulation coding parameters used for data transmission between the second node and the first node in the time windows obtained through division; and
send, to the second node, information about the time windows obtained through division and the modulation coding parameters used in the time windows obtained through division;
wherein when the computer executes the computer-readable instruction, the computer is caused to:
determine whether a timestamp at which the channel status is a transition state exists in the alternating current cycle, wherein that the channel status is the transition state indicates that the channel capacity varies; and
in response to determining the timestamp exists, divide the alternating current cycle into the time windows using the timestamp at which the channel status is the transition state as a dividing point; and
in response to determining the timestamp does not exist, use the alternating current cycle as the time windows,
wherein when the computer executes the computer-readable instruction, the computer is caused to:
in response to the first node determining that a quantity of carriers that meet a preset condition in two adjacent time periods in the alternating current cycle is greater than a first preset value, determine a critical point of the two adjacent time periods as the timestamp at which the channel status is the transition state, wherein the preset condition is that a difference between amplitudes of channel responses corresponding to the respective carrier in the two adjacent time periods is greater than a second preset value; or
in response to the first node determining that a difference between average values of amplitudes of channel responses corresponding to N carriers in two adjacent time periods is greater than a third preset value, determine a critical point of the two adjacent time periods as the timestamp at which the channel status is the transition state, wherein n is a positive integer.

10. The non-transitory computer storage medium according to claim 9, wherein when the computer executes the computer-readable instruction, the computer is caused to:
after dividing the alternating current cycle into time windows, send the information about the time windows obtained through division to the second node; and
after determining the modulation coding parameters used for data transmission between the second node and the first node in the time windows obtained through division, send the modulation coding parameters used in the time windows obtained through division to the second node.

11. The non-transitory computer storage medium according to claim 10, wherein when the computer executes the computer-readable instruction, the computer is caused to:
in response to the first node determining that a difference between channel noise levels in another two adjacent time periods in the alternating current cycle is greater than a fourth preset value, determining, by the first node, a critical point of the another two adjacent time periods as another timestamp at which the channel status is the transition state.

* * * * *